Patented Dec. 23, 1930

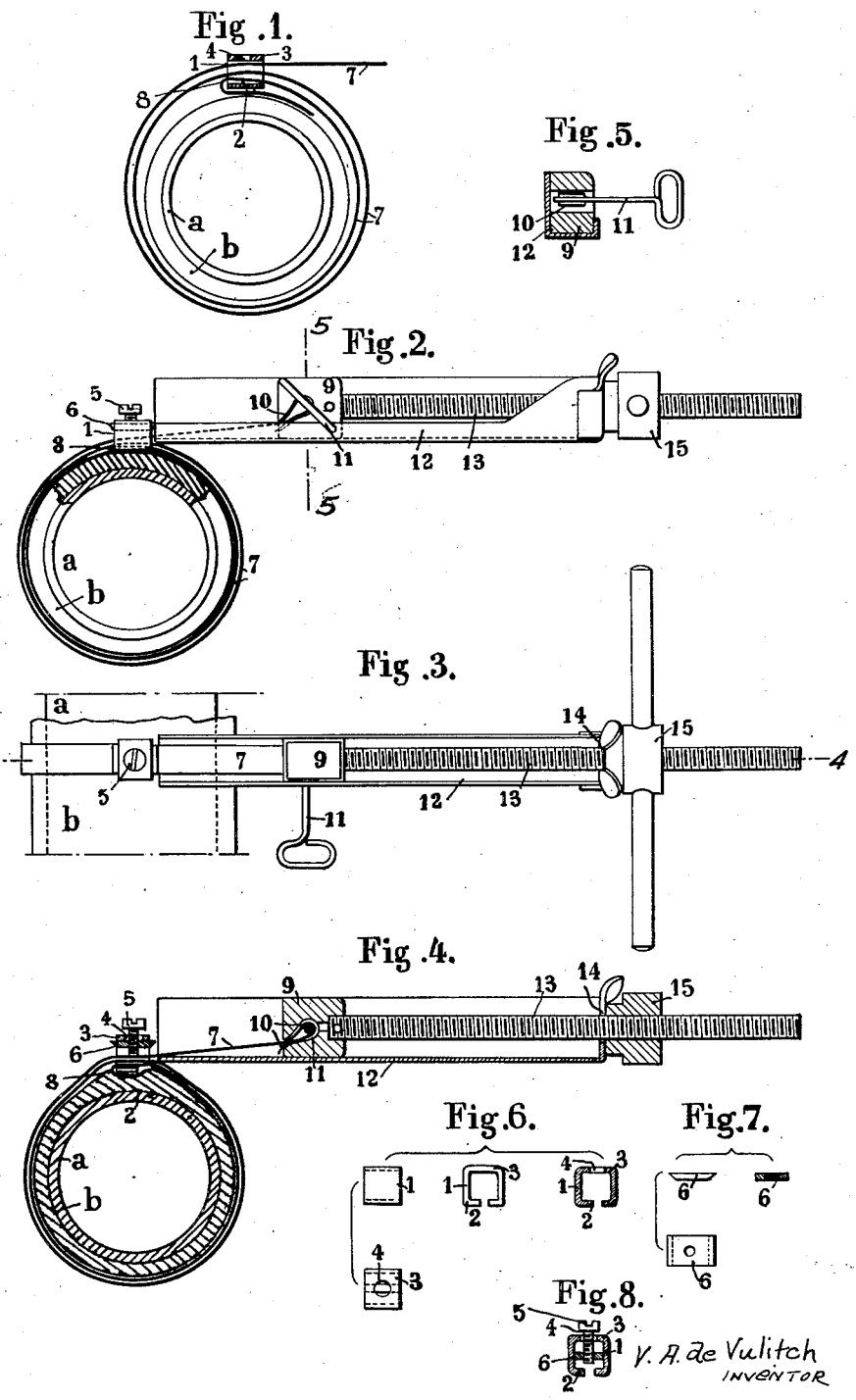

1,786,107

UNITED STATES PATENT OFFICE

VLADIMIR ANTOINE DE VULITCH, OF PARIS, FRANCE

CLAMPING COLLAR

Application filed April 29, 1929, Serial No. 359,104, and in France June 29, 1928.

The present invention relates to a device for the attachment of rubber tubes on a metallic connection and has for its object to provide a device which is constructed in such a way as to permit the attachment to be obtained and the joint between the said tube and the connection rendered fluid tight by the energetic clamping and locking around this tube of a flexible metallic band surrounding the latter a number of times.

In order to make the invention clear the clamping collar according to the invention will now be described with reference to the accompanying drawing which illustrates by way of example one form of construction.

Figure 1 shows the collar which is loose and has been placed on a rubber tube which is to be secured upon a metal tube.

Figure 2 is a front elevation showing the collar and a device for tightening the latter.

Figure 3 is a corresponding plan view.

Figure 4 is a vertical section taken along the line 4—4 in Fig. 3.

Figure 5 is a section along the line 5—5 in Fig. 2.

Figure 6 shows the loop in detail, in front view, in end view, in vertical cross section and in plan.

Figure 7 shows the nut lodged in the said loop in elevation, section and plan.

Figure 8 is a vertical cross section of the loop provided with its tightening member.

As shown in the accompanying drawing the device according to the invention is adapted to permit a rubber tube $b$ to be mounted upon a tube or upon a metallic connection $a$ which rubber tube must be mounted upon the connection $a$ in a perfectly fluid tight manner.

The device according to the invention essentially comprises a loop 1 of tubular form which may be formed by a band of thin and strong metal of any width suitably bent and bent back again as shown in the example shown in Fig. 6 so as to comprise two superposed cross members 2 and 3.

The two ends of the metallic band forming the lower cross member 2 of the loop may be connected by soldering, welding if desired, as shown, while the upper cross member 3 is pierced at its centre with a hole 4 of suitable diameter to permit the free passage of a screw 5.

This screw 5, the head of which projects above the cross member 3, engages with a nut 6 mounted in the loop in the interior of which it can move practically without turning. The lower cross member 2 of the loop serves as attachment member for a flexible metal band 7 which is folded at one end at 8 in order to hook on to the said cross member and is wound twice around the rubber tube $b$ to be attached to the metal tube $a$ by passing through the loop 1, the screw 5 of which has been previously suitably slackened.

The attachment of the rubber tube $b$ upon the metallic tube or connection $a$ is obtained by exerting a suitable pull upon the free end of the flexible band 7 and tightening the tension formed by the said band around the tube $b$.

This tightening of the tension formed by the double winding of the band 7 has the effect of compressing the rubber tube $b$ over the whole of its periphery and pressing it firmly against the metallic connection $a$ thus producing a fluid tight connection.

In order to tension the band 7 in a perfect manner use is made for example of the device shown in Figs. 2 to 4 which comprises essentially a block 9 suitably notched to receive the folded free end 10 of the band 7 which is held in the said block by means of a pin 11.

This block is formed by a metal block which slides freely in a guide 12 of L-shaped cross section and is rigid with a screw 13 freely engaged in a recess 14 in the back wall of the guide 12 and provided with a screw 15.

The flexible metallic band 7 being wound around the rubber tube $b$ as shown in Fig. 1 and folded at its free end, is engaged in the aperture in the jaw 9 and then surrounds the latter as shown in Fig. 2 by placing the pin 11 in position.

The guide 12 is held in the hand and during the rotation of the nut 15 abuts against the lower cross member of the loop 1 so as to bear against the latter and it will be noticed that the effect of the continued movement of rotation imparted by the hand to the nut 15 will be to exert a pull upon the band 7 and cause the tension formed by the latter to be tightened gradually upon the tube $b$.

When it has been sufficiently tightened to secure the attachment of the rubber tube $b$ upon the connection $a$ and produce a fluid tight joint, the band 7 is locked by tightening the screw 5, the nut 6 of which will bear upon the inner face of the upper cross member 3 of the loop 1 and the pin 11 is then removed in order to disengage the tightening device.

It must be noted that the loop 1 to which the band 7 is attached and which carries the screw keeping the latter in the tightened position, is made of very thin metal so that the tension formed by the band 7 are practically pressed over their whole length upon the rubber tube $b$ and the latter undergoes no deformation and is kept intimately pressed upon the metallic connection $a$. Under these conditions the joint is rendered fluid tight in a perfect manner.

Further, the clamping action of the band 7 is preserved by means of the simple pressure exerted upon it by the screw 5 so that the said band is not cut and it can easily be removed from the loop after releasing the screw and be again employed.

The above described constructional arrangements are only given by way of example and the forms, materials and dimensions of the constituent parts and also the constructional details of the device for tensioning the band may be modified without on that account going outside the scope of the invention.

Claims :—

1. A clamping collar for the attachment of tubular bodies including a flexible metallic band passing about the tubular body and having its inner and outer ends overlapped, a loop member receiving the flexible band, the inner end of said band being bent back over one side of the loop member, and adjustable means coacting with the opposite side of the loop member for gripping the outer end portion of the flexible band to secure the latter in position, said means acting to exert pressure also on the inner end of the band to secure the latter in position on the first mentioned side of the loop member.

2. A clamping collar for the attachment of tubular bodies including a flexible metallic band passing around the body, a loop receiving said band, one end of the band being bent over and secured by one side of said loop member, a nut movable in said loop member, a screw threaded in said nut and passing through the side of the loop member opposite the bent end of the band, said screw being adapted to be adjusted to bring the nut against the last mentioned side of the loop member and cause the inner extremity of the screw to bear upon and secure the band.

The foregoing specification of my "clamping collar" signed by me this 18th day of April, 1929.

VLADIMIR ANTOINE de VULITCH.